US012466361B2

(12) United States Patent
Fujita et al.

(10) Patent No.: US 12,466,361 B2
(45) Date of Patent: Nov. 11, 2025

(54) VEHICLE INFORMATION PROCESSING DEVICE

(71) Applicant: TOYOTA JIDOSHA KABUSHIKI KAISHA, Toyota (JP)

(72) Inventors: Koichi Fujita, Toyota (JP); Jun Tohyama, Nisshin (JP); Daisuke Akaho, Nagoya (JP); Yuta Maniwa, Susono (JP); Natsumi Izawa, Kariya (JP); Shunichiroh Sawai, Tokyo-to (JP); Masahiko Nakamura, Okazaki (JP); Kenichiro Aoki, Machida (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 23 days.

(21) Appl. No.: 18/610,506

(22) Filed: Mar. 20, 2024

(65) Prior Publication Data

US 2024/0367611 A1 Nov. 7, 2024

(30) Foreign Application Priority Data

May 1, 2023 (JP) .................................. 2023-075847

(51) Int. Cl.
*B60R 25/102* (2013.01)
*B60R 25/01* (2013.01)
*B60R 25/10* (2013.01)
*B60R 25/24* (2013.01)
*B60R 25/25* (2013.01)

(52) U.S. Cl.
CPC ............ *B60R 25/102* (2013.01); *B60R 25/01* (2013.01); *B60R 25/24* (2013.01); *B60R 25/25* (2013.01); *B60R 2025/1016* (2013.01); *B60R 2325/205* (2013.01)

(58) Field of Classification Search
None
See application file for complete search history.

(56) References Cited

U.S. PATENT DOCUMENTS

| 8,768,565 | B2* | 7/2014 | Jefferies | G07C 5/0808 |
| | | | | 701/32.7 |
| 9,947,153 | B2* | 4/2018 | Bergerhoff | H04L 9/0869 |
| 10,249,182 | B1* | 4/2019 | Turner | H04W 4/44 |
| 10,501,055 | B1* | 12/2019 | Yi | G06Q 50/40 |
| 10,507,795 | B1* | 12/2019 | Schubert | B60R 25/241 |
| 11,403,638 | B2* | 8/2022 | Hassani | G06Q 20/3821 |

(Continued)

FOREIGN PATENT DOCUMENTS

JP 2020-102252 A 7/2020

*Primary Examiner* — Carlos Garcia
(74) *Attorney, Agent, or Firm* — Oliff PLC

(57) ABSTRACT

A vehicle information processing device, for application to a vehicle configured to perform all driving operations under a fixed condition, the device includes; a terminal identification section configured to identify a portable terminal corresponding to authentication information authenticated by an authentication device provided at the vehicle; a driver's terminal setting section configured to set a driver's terminal used by a driver, based on information received from the identified portable terminal; and a notification section configured to notify the driver's terminal in a case in which a predetermined condition is satisfied in an autonomous driving state in which all driving operations are performed by the vehicle.

3 Claims, 5 Drawing Sheets

(56) References Cited

U.S. PATENT DOCUMENTS

| | | | |
|---|---|---|---|
| 2014/0266594 A1* | 9/2014 | Reiser | G08C 17/02 |
| | | | 340/5.2 |
| 2016/0247144 A1* | 8/2016 | Oh | G06K 7/083 |
| 2017/0017963 A1* | 1/2017 | Cho | G06Q 20/3229 |
| 2017/0263062 A1* | 9/2017 | Bergerhoff | B60R 25/04 |
| 2018/0345980 A1 | 12/2018 | Morita et al. | |
| 2019/0058596 A1* | 2/2019 | Chang | H04L 9/3247 |
| 2022/0024408 A1* | 1/2022 | Narumi | B60R 25/24 |
| 2022/0191022 A1* | 6/2022 | Ohashi | H04L 9/0891 |
| 2024/0367611 A1* | 11/2024 | Fujita | B60R 25/01 |

\* cited by examiner

VEHICLE INFORMATION PROCESSING DEVICE

CROSS-REFERENCE TO RELATED APPLICATION

This application is based on and claims priority under 35 USC 119 from Japanese Patent Application No. 2023-075847 filed on May 1, 2023, the disclosure of which is incorporated by reference herein.

BACKGROUND

Technical Field

The present disclosure relates to a vehicle information processing device.

Related Art

Japanese Patent Application Laid-open (JP-A) No. 2020-102252 discloses a driver monitoring system that performs communication between a portable terminal and a vehicle control device and monitors a driver of a host vehicle. In the driver monitoring system of JP-A No. 2020-102252, it is determined whether or not the driver of the host vehicle is looking at the display screen of the portable terminal during travel of the host vehicle, based on an image captured by the camera of the portable terminal, and an alert is generated in a case in which it is determined that the driver is looking at the display screen of the portable terminal.

However, in the driver monitoring system described in JP-A No. 2020-102252, since the portable terminal of the driver cannot be specified in cases in which more than one portable terminal is present inside the vehicle, alerts are made with respect to all the portable terminals, which is bothersome.

SUMMARY

The present disclosure obtains a vehicle information processing device that, in a vehicle capable of autonomous driving at level 3 or higher, which enables all driving operations under a fixed condition, is able to provide a predetermined notification to only the driver.

A vehicle information processing device according to a first aspect is a vehicle information processing device for application to a vehicle configured to perform all driving operations under a fixed condition, the device including: a terminal identification section configured to identify a portable terminal corresponding to authentication information authenticated by an authentication device provided at the vehicle; a driver's terminal setting section configured to set a driver's terminal used by a driver, based on information received from the identified portable terminal; and a notification section configured to notify the driver's terminal in a case in which a predetermined condition is satisfied in an autonomous driving state in which all driving operations are performed by the vehicle.

The vehicle information processing device according to the first aspect is applied to a vehicle that is capable of all driving operations under a fixed condition. Moreover, the terminal identification section of the vehicle information processing device identifies a portable terminal corresponding to authentication information authenticated by an authentication device provided in the vehicle. The driver's terminal setting section sets a driver's terminal used by the driver based on information received from the identified portable terminal. Further, the notification section notifies the driver's terminal in a case in which a predetermined condition is satisfied in an autonomous driving state in which all driving operations are performed by the vehicle.

As a result, unnecessary notification can be kept from being provided by the notification section to terminals other than the driver's terminal. Moreover, by notifying the driver's terminal, even in situations in which the driver is not paying attention to the forward area of the vehicle, a transition to manual driving, a proposal for a lane change, and the like can be communicated. Note that the term "authentication information" as used herein is not limited to information used to directly authenticate a portable terminal, and is a concept broadly including biometric information and the like for authenticating an occupant holding a portable terminal.

A vehicle information processing device according to a second aspect is the first aspect, in which the driver's terminal setting section sets the identified portable terminal as the driver's terminal when a signal designating the driver is received from the identified portable terminal via a predetermined application.

In the vehicle information processing device according to the second aspect, when a signal designating the driver is received from the identified portable terminal via a predetermined application, the portable terminal is set as the driver's terminal. As a result, the driver can set the driver's terminal simply by performing a predetermined operation via an application of the portable terminal, eliminating the need for an operation in the vehicle or the like.

A vehicle information processing device according to a third aspect is the first aspect, in which the authentication device is provided peripherally to plural seats including the driver's seat, and the driver's terminal setting section sets, as the driver's terminal, a portable terminal corresponding to authentication information authenticated by the authentication device provided at the driver's seat.

In the vehicle information processing device according to the third aspect, the driver can easily set the driver's terminal simply by authentication using the authentication device provided at the driver's seat.

A vehicle information processing device according to a fourth aspect is the first aspect, in which the authentication device is configured to authenticate at least one of a fingerprint, a voice print, an iris, or a face, of an occupant, and the terminal identification section identifies a portable terminal corresponding to an occupant identified based on the authentication information authenticated by the authentication device.

In the vehicle information processing device according to the fourth aspect, an occupant uses the authentication device to authenticate at least one of a fingerprint, a voice print, an iris, or a face, whereby a portable terminal can be identified. As a result, the portable terminal can be identified without using the portable terminal.

A vehicle information processing device according to a fifth aspect is any one of the first to fourth aspects, in which a transition to an autonomous driving state is restricted until setting of a driver's terminal is performed by the driver's terminal setting section.

In the vehicle information processing device according to the fifth aspect, by restricting a transition to an autonomous driving state until the setting of the driver's terminal is performed, safety during autonomous driving can be improved.

As explained above, according to the vehicle information processing device of the present disclosure, in a vehicle that is capable of autonomous driving at a level of 3 or higher, in which all driving operations can be performed under a fixed condition, a predetermined notification can be provided to only the driver.

BRIEF DESCRIPTION OF THE DRAWINGS

An exemplary embodiment of the present disclosure will be described in detail based on the following figures, wherein.

DETAILED DESCRIPTION

Explanation follows regarding a system S including a vehicle information processing device 10 according to an exemplary embodiment, with reference to the drawings.

Figure 1:
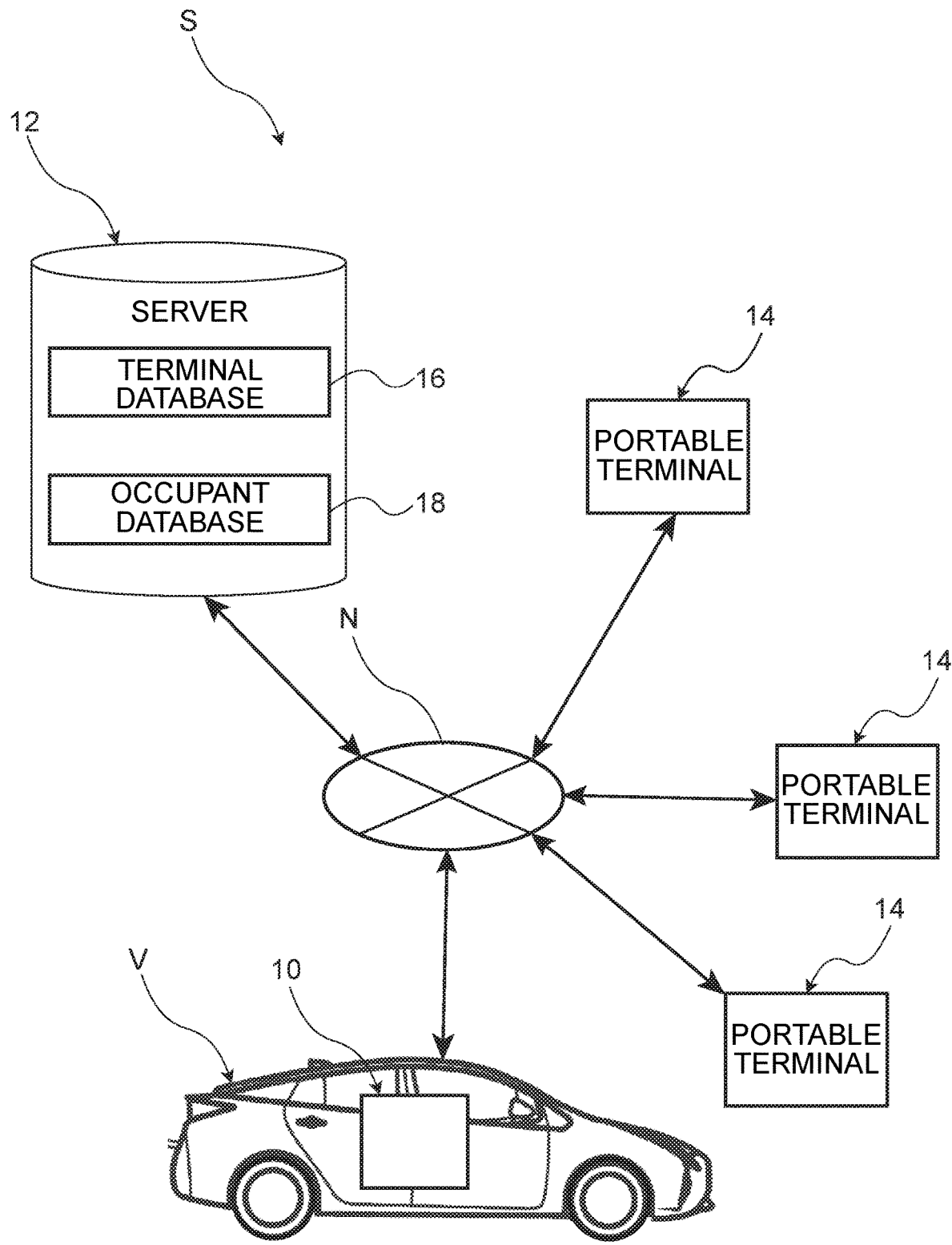
FIG. 1 is a schematic diagram schematically illustrating an entire system including a vehicle information processing device according to an exemplary embodiment.

As illustrated in FIG. 1, the system S according to the present exemplary embodiment is configured including a vehicle information processing device 10 and a server 12. The vehicle information processing device 10 and the server 12 are connected through a network N so as to be capable of communicating with each other. Moreover, plural portable terminals 14 are made capable of communicating with the vehicle information processing device 10 via the network N.

The vehicle information processing device 10 is installed, for example, in a vehicle V, and is configured to perform information processing between the server 12 and the portable terminal 14. Note that the vehicle information processing device 10 may be provided externally to the vehicle V. In this case, the vehicle information processing device 10 is configured so as to be capable of communicating with an onboard unit or the like installed in the vehicle V, via the network N.

The vehicle V is configured so as to be capable of switching between autonomous driving and manual driving. In particular, in the present exemplary embodiment, the vehicle V is capable of autonomous driving at a level of 3 or higher, which enables all driving operations under fixed conditions.

The server 12 holds various data. In the present exemplary embodiment, as an example, the server 12 is configured including a terminal database 16 and an occupant database 18. The terminal database 16 holds information relating to plural portable terminals 14 that may be brought inside the vehicle V. For example, the terminal database 16 holds information such as an identification number and a notification application of each portable terminal 14.

The occupant database 18 holds information relating to plural occupants who may come onboard the vehicle V. For example, the occupant database 18 holds an identification number of each occupant, information on the portable terminal held by the occupant, information relating to the presence or absence of a driving license, and biometric information. The biometric information is information including at least one of a fingerprint, a voice print, an iris, or a face; however, there is no limitation thereto, and the biometric information may include information relating to a vein or the like.

The portable terminal 14 is a terminal that an occupant of the vehicle V is able to bring into the vehicle V, and includes a cellular phone, a smart phone, a tablet, a laptop personal computer, and the like. Note that although FIG. 1 illustrates three portable terminals 14, there is no limitation thereto, and four or more portable terminals 14 may be connected to the network N. Alternatively, two or fewer portable terminals 14 may be connected to the network N.

The system S of the present exemplary embodiment is configured as described above, and the vehicle information processing device 10 identifies a portable terminal that corresponds to authentication information authenticated by an authentication device 32 (see FIG. 2) provided in the vehicle V, and a driver's terminal used by the driver is set based on information received from the identified portable terminal. Moreover, the vehicle information processing device 10 is configured to provide notification to the driver's terminal in a case in which predetermined conditions are satisfied in an autonomous driving state in which all driving operations are performed by the vehicle V.

(Hardware Configuration of Vehicle V)

Figure 2:
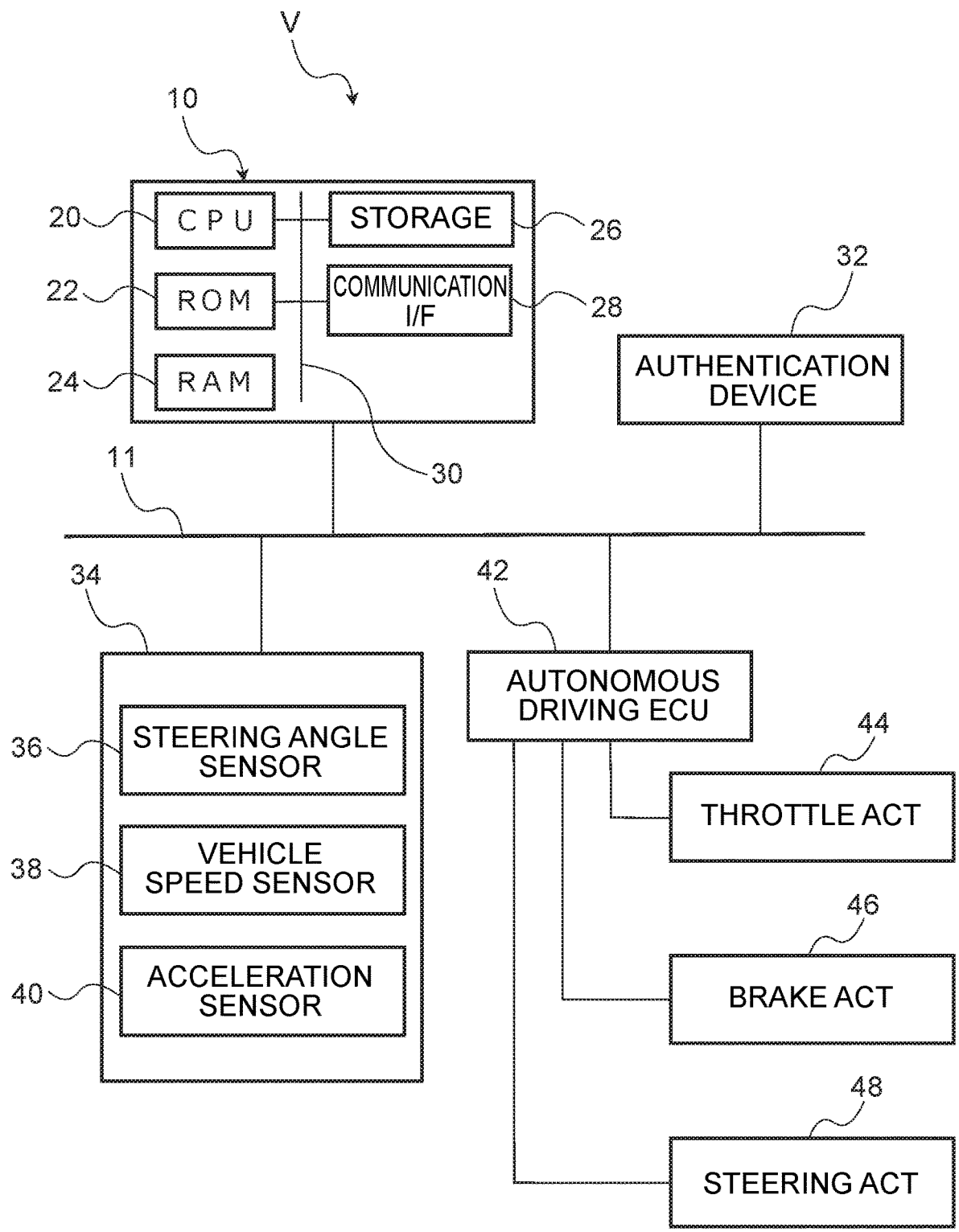
FIG. 2 is a block diagram illustrating an exemplary hardware configuration of a vehicle according to an exemplary embodiment.

As illustrated in FIG. 2, the system installed in the vehicle V includes a communication bus 11, and the communication bus 11 is electrically connected to the vehicle information processing device 10, the authentication device 32, a vehicle travel state detection sensor group 34, an autonomous driving electronic control unit (ECU) 42, a non-illustrated peripheral situation acquisition device, and the like.

The vehicle information processing device 10 is configured including a central processing unit (CPU; processor) 20, read only memory (ROM) 22, random access memory (RAM) 24, a storage 26, and a communication interface (communication I/F) 28. These respective configurations are connected together through an internal bus 30 so as to be capable of communicating with each other.

The CPU 20 is a central processing unit that executes various programs and controls various sections. Namely, the CPU 20 reads a program from the ROM 22 or the storage 26, and executes the program using the RAM 24 as a workspace. The CPU 20 controls the respective configurations described above and performs various computation processing in accordance with a program recorded in the ROM 22 or the storage 26.

The ROM 22 holds various programs and various data. The RAM 24 serves as a workspace to temporarily store programs and data. The storage 26 is configured by a hard disk drive (HDD) or a solid state drive (SSD), and is a non-transitory recording medium that holds various programs including an operating system, as well as various data. In the present exemplary embodiment, a program or the like for performing various processing is stored in the ROM 22 or the storage 26.

The communication I/F 28 is an interface used by the vehicle information processing device 10 to communicate with the server 12, the portable terminal 14, and the like and, for example, uses a protocol such as CAN (Controller Area Network), Ethernet (registered trademark), LTE (Long Term Evolution), FDDI (Fiber Distributed Data Interface), or Wi-Fi (registered trademark).

The authentication device 32 is provided in the surroundings of plural seats including the driver's seat. In the present exemplary embodiment, as an example, an authentication device 32 corresponding to all the seats is provided. Moreover, the authentication device 32 is configured to be capable of authenticating at least one of an occupant's fingerprint, voice print, iris, or face. For example, in a case in which the authentication device 32 is a device that authenticates a fingerprint, the authentication device 32 may be configured including a fingerprint sensor provided on an armrest or the like adjacent to each seat. Moreover, for example, in a case in which the authentication device 32 is a device that authenticates a voice print, the authentication device 32 may be configured including directional microphones respectively arranged around the respective seats so as to be capable of collecting sound generated from the seats. Moreover, for example, in a case in which the authentication device 32 is a device that authenticates an iris or a face, an optical camera directed toward each seat may be arranged, and the authentication device 32 may be configured including this optical camera. Authentication information authenticated by the authentication device 32 is transmitted to the vehicle information processing device 10.

The vehicle travel state detection sensor group 34 includes, as sensors that acquire a travel state of the vehicle V, a steering angle sensor 36 that detects a steering angle of a vehicle V, a vehicle speed sensor 38 that detects the travel speed of vehicle V, and an acceleration sensor 40 that detects acceleration applied to the vehicle V.

The autonomous driving ECU 42 is electrically connected to a throttle ACT 44 that changes the degree of throttle opening of the vehicle V, a brake ACT 46 that changes the braking force, and a steering ACT 48 that changes the amount of steering by a steering device. The autonomous driving ECU 42 is an ECU that performs autonomous driving processing that causes the vehicle V to travel automatically without concomitant driving operations by an occupant of the vehicle V. In particular, in the present exemplary embodiment, the autonomous driving ECU 42 is configured to be capable of autonomous driving processing of level 3 or higher. During autonomous driving at level 3 or higher, the driver is released from responsibility for driving operations, and there is no need for the driver to pay attention to the forward area of the vehicle. As a result, the driver can operate the portable terminal 14 during autonomous driving at level 3 or higher.

The autonomous driving ECU 42 includes a central processing unit (CPU), read only memory (ROM), random access memory (RAM), or other memory, a non-volatile storage section such as a hard disk drive (HDD) or solid state drive (SSD), and a communication interface (I/F). The storage section holds autonomous driving software.

Although not illustrated in the drawings, the vehicle V includes a peripheral situation acquisition device, and the peripheral situation acquisition device is electrically connected to the communication bus 11. The peripheral situation acquisition device is a group of sensors that acquire information on the periphery of the vehicle V when the vehicle V performs autonomous driving processing, and examples include a global navigation satellite system (GNSS) device, an onboard communication device, a navigation system, a radar device, and a peripheral camera.

A GNSS device receives GNSS signals from plural GNSS satellites and measures the position of the vehicle V. An onboard communication device is a communication device that performs at least one of vehicle-to-vehicle communication with another vehicle or road-to-vehicle communication with a roadside unit (RSU). A navigation system includes a map information storage section that holds map information, and displays the position of the vehicle V on a map based on the position information acquired from the GNSS device and the map information stored in the map information storage section. A radar device detects an object, such as a pedestrian or another vehicle, present in the vehicle V surroundings as point cloud information, and acquires the relative position and relative speed of the detected object and the vehicle V. Moreover, based on changes in relative positions, relative speeds, and the like of individual objects included in the most recent plural instances of detection results, the radar device tracks and monitors specific objects such as pedestrians and other vehicles as monitoring target objects and excludes noise and roadside objects such as guard rails from the monitoring target. Peripheral cameras image the surroundings of the vehicle V with plural cameras, and output the captured images.

(Hardware Configuration of Portable Terminal 14)

Figure 3:
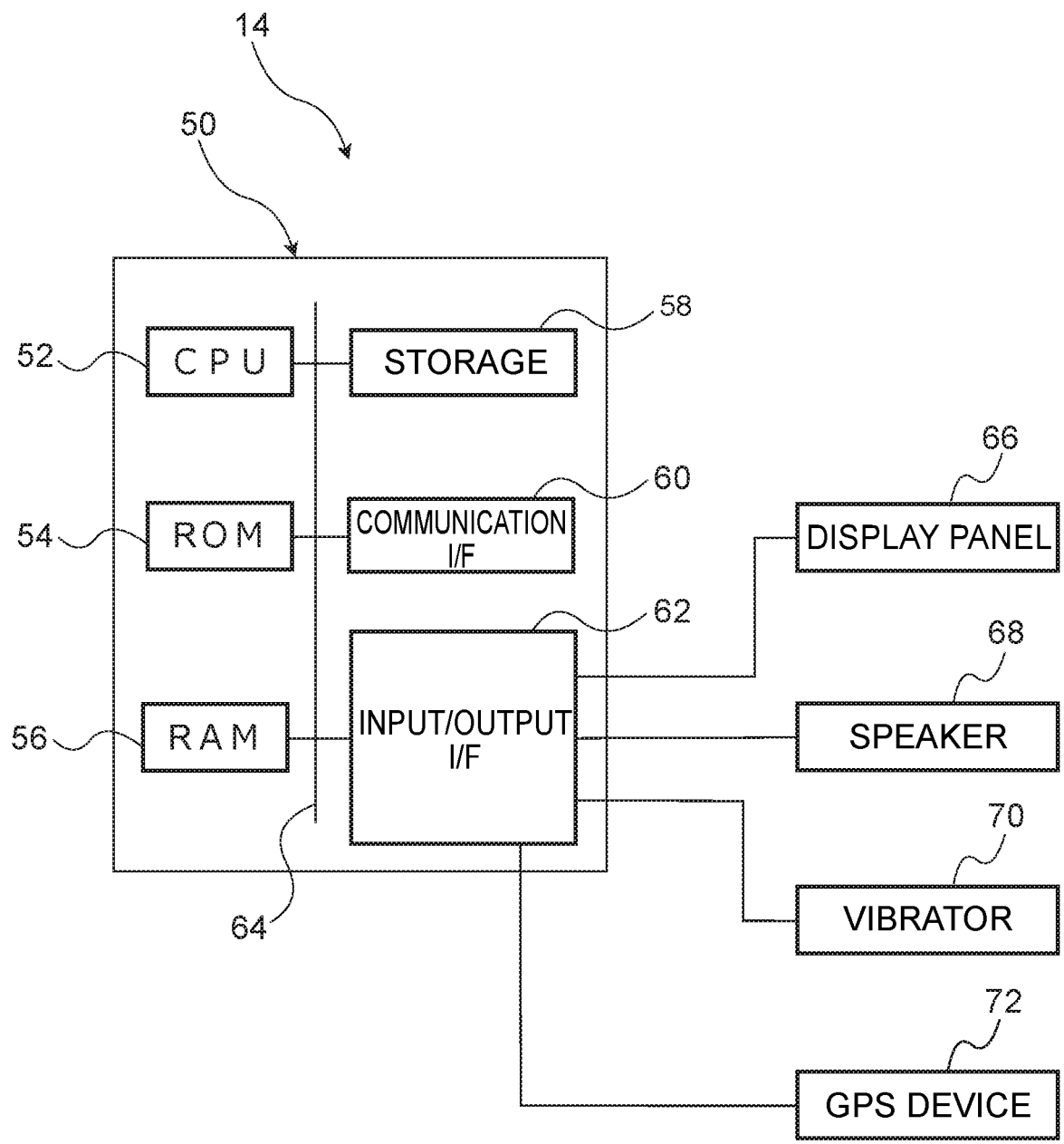
FIG. 3 is a block diagram illustrating an exemplary hardware configuration of a portable terminal in an exemplary embodiment.

As illustrated in FIG. 3, each of the portable terminals 14 is configured including a CPU 52, a ROM 54, a RAM 56, a storage 58, a communication interface (communication I/F) 60, and an input/output interface (input/output I/F) 62. These respective configurations are connected together through an internal bus 64 so as to be capable of communicating with each other.

The CPU 52 is a central processing unit that executes various programs and controls various sections. Namely, the CPU 52 reads a program from the ROM 54 or the storage 58, and executes the program using the RAM 56 as a workspace. The CPU 52 controls the respective configurations and performs various computation processing in accordance with a program recorded in the ROM 54 or the storage 58.

The ROM 54 holds various programs and various data. The RAM 56 serves as a workspace to temporarily store programs and data. The storage 58 is configured by a hard disk drive (HDD) or a solid state drive (SSD), and is a non-transitory recording medium that holds various programs including an operating system, as well as various data. In the present exemplary embodiment, a program or the like for performing various processing is stored in the ROM 54 or the storage 58.

The communication I/F 60 is an interface used by the portable terminal 14 to communicate with the vehicle information processing device 10 and the like and, for example, uses a protocol such as Ethernet (registered trademark), Long Term Evolution (LTE), Fiber Distributed Data Interface (FDDI), Wi-Fi (registered trademark), Bluetooth (registered trademark), or Near Field Communication (NFC).

The input/output I/F 62 is electrically connected to a display panel 66, a speaker 68, a vibrator 70, and a GPS device 72. The display panel 66 displays predetermined information. The speaker 68 is configured to be capable of outputting sound. The vibrator 70 vibrates when a predetermined signal is received. The GPS device 72 receives GPS signals from a GPS satellite and measures the position of the portable terminal 14.

(Functional Configuration of Vehicle Information Processing Device 10)

The vehicle information processing device 10 implements various functions using the above-described hardware resources. Explanation follows regarding the functional configuration implemented by the vehicle information processing device 10, with reference to FIG. 4.

Figure 4:
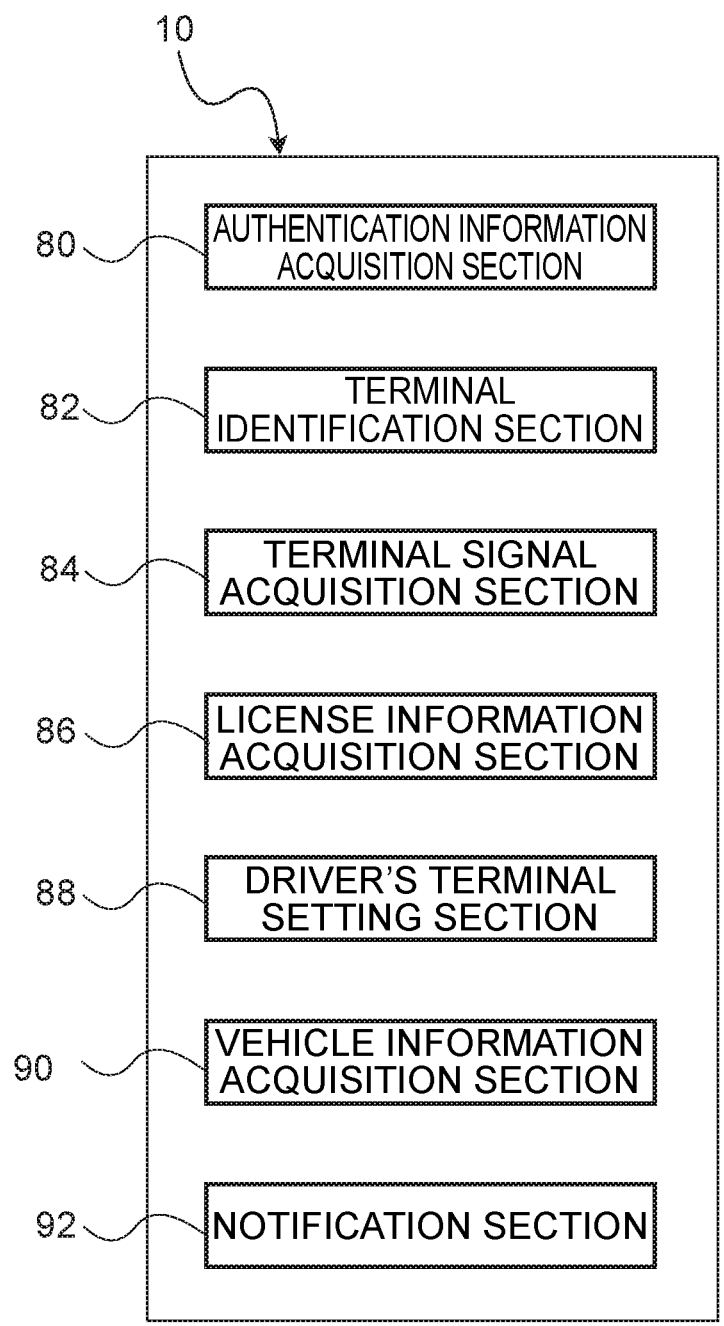
FIG. 4 is a block diagram illustrating an exemplary functional configuration of a vehicle information processing device according to an exemplary embodiment.

As illustrated in FIG. 4, as functional configuration, the vehicle information processing device 10 is configured including an authentication information acquisition section 80, a terminal identification section 82, a terminal signal acquisition section 84, a license information acquisition section 86, a driver's terminal setting section 88, a vehicle information acquisition section 90, and a notification section 92. Note that the respective functional configurations are implemented by the CPU 20 reading and executing a program stored in the ROM 22 or the storage 26.

The authentication information acquisition section 80 acquires authentication information authenticated by the authentication device 32. For example, in a case in which the authentication device 32 includes a fingerprint sensor, the authentication information acquisition section 80 acquires information relating to fingerprint data as authentication information. Moreover, in a case in which the authentication device 32 includes a directional microphone, the authentication information acquisition section 80 acquires information relating to audio data as authentication information. Moreover, in a case in which the authentication device 32 includes an optical camera, the authentication information acquisition section 80 acquires information relating to iris data, the shape of the face, or the like as authentication information.

The terminal identification section 82 identifies the portable terminal corresponding to the authentication information. More specifically, the terminal identification section 82 identifies the portable terminal 14 that corresponds to the occupant identified based on the authentication information authenticated by the authentication device 32. Namely, the terminal identification section 82 identifies an occupant that matches the authentication information by referencing the authentication information and the occupant information stored in the occupant database 18. Moreover, after identifying an occupant, based on the data stored in the occupant database 18 and the terminal database 16, the terminal identification section 82 identifies the portable terminal 14 held by the occupant (corresponding to the occupant).

The terminal signal acquisition section 84 acquires a predetermined signal transmitted from the authenticated portable terminal 14. For example, when a predetermined application is started using the identified portable terminal 14, a signal may be transmitted from the portable terminal 14 to the vehicle information processing device 10, and the terminal signal acquisition section 84 may acquire the signal. Moreover, in a case in which a predetermined application is started using the identified portable terminal 14 and then a predetermined operation is executed by the application, a signal may be transmitted from the portable terminal 14 to the vehicle information processing device 10, and the terminal signal acquisition section 84 may acquire the signal. For example, the terminal signal acquisition section 84 may acquire a signal indicating that the occupant is a driver by execution of an operation to register the occupant from the identified portable terminal 14 through a predetermined application.

The license information acquisition section 86 refers to information relating to the presence or absence of a driving license for an occupant that matches the authentication information. More specifically, the occupant information stored in the occupant database 18 is referenced to access information relating to the presence or absence of a driving license. Note that in cases in which, from age information, the age is less than the age at which a driving license can be acquired, a determination may be made that there is no driving license.

The driver's terminal setting section 88 sets a driver's terminal used by the driver based on information received from the portable terminal 14 identified by the terminal identification section 82. More specifically, the driver's terminal setting section 88 sets the portable terminal 14 from which the terminal signal acquisition section 84 acquired the signal indicating driver status, as the driver's terminal. At this time, the driver's terminal setting section 88 may exclude a portable terminal of an occupant who does not have a driving license from candidates for the driver's terminal.

Further, the driver's terminal setting section 88 may set the portable terminal 14 authenticated by an authentication device provided in the driver's seat as a driver's terminal. Note that in the present exemplary embodiment, as an example, a transition to an autonomous driving state is limited until the setting of the driver's terminal by the driver's terminal setting section 88 is performed. Namely, even in a state in which it is possible to switch to autonomous driving of level 3 or higher, in a case in which the driver's terminal is not set, a switch to autonomous driving is not performed. Moreover, in cases in which it is determined, based on the GPS information of the driver's terminal, that the driver's terminal is not present in the vehicle cabin of the vehicle V, a switch to autonomous driving is not performed.

The vehicle information acquisition section 90 acquires information such as a travel state of the vehicle V. For example, the vehicle information acquisition section 90 ascertains that the vehicle V is in an autonomous driving state of level 3 or higher (autonomous driving state in which all driving operations are performed by the vehicle).

The notification section 92 notifies the driver's terminal in a case in which the state of the vehicle V acquired by the vehicle information acquisition section 90 satisfies a predetermined condition. For example, the notification section 92 notifies the driver's terminal when the distance or time required for the vehicle V to transition from a level 3 autonomous driving state to a level 2 autonomous driving state is less than a predetermined value. Moreover, for example, the notification section 92 notifies the driver's terminal when the distance or time required for the vehicle V to transition from the level 3 autonomous driving state to manual driving is less than a predetermined value.

Moreover, the notification section 92 may notify the driver's terminal when the vehicle V is in the level 3 autonomous driving state and proposals such as lane changes, route changes, and overtaking are made. Alternatively, the notification section 92 may notify the driver's terminal in a case in which the amount of fuel in the vehicle V is low or in a case in which the remaining battery amount is low. Moreover, the notification section 92 may notify the driver's terminal when the system transitions to a state of a minimum risk maneuver (MRM), which is motion control of the vehicle V until a minimum risk condition (MRC) is reached.

(Operation)

Next, explanation follows regarding the mechanism of the present exemplary embodiment.

Figure 5:
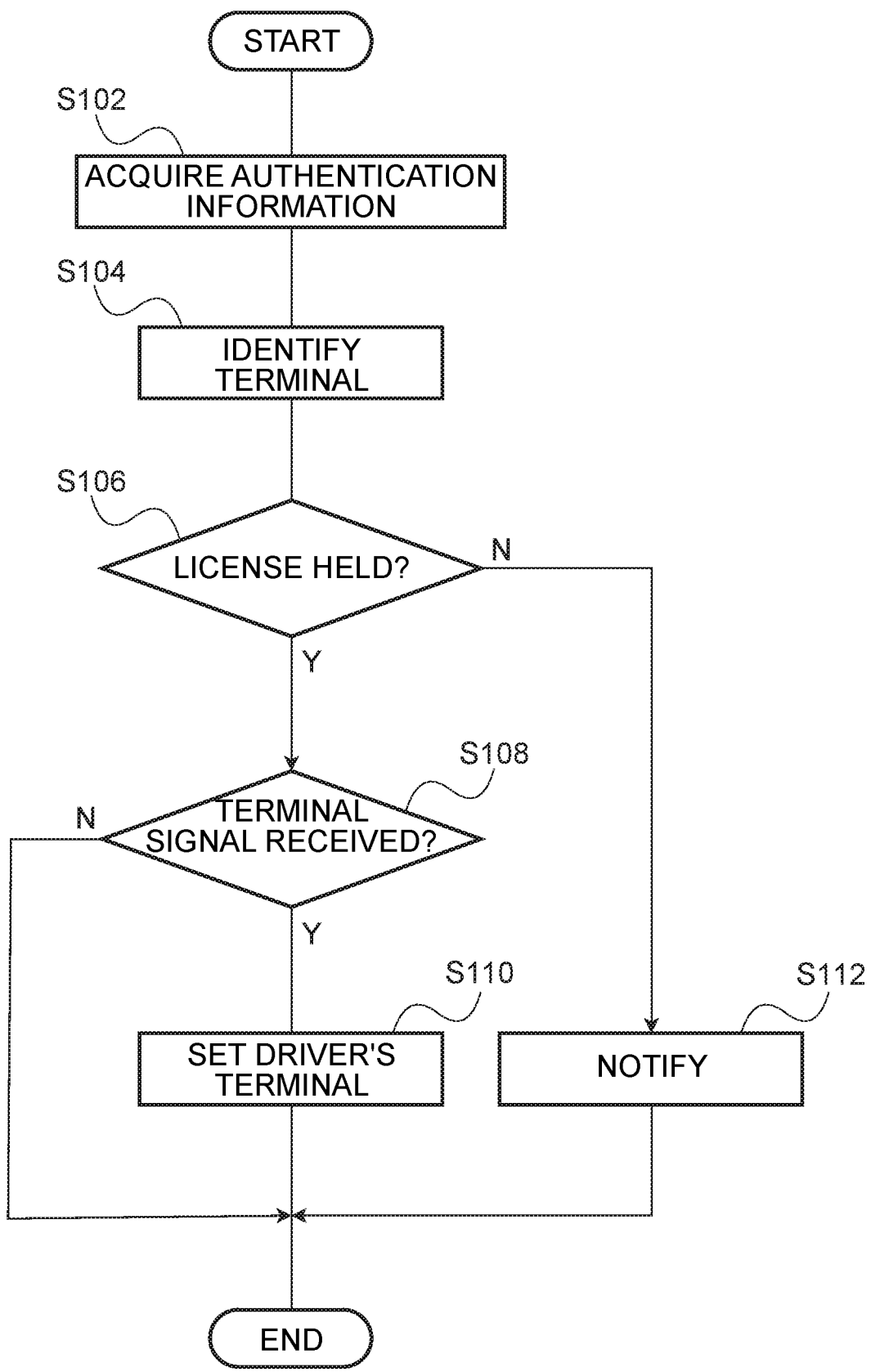
FIG. 5 is a flow chart illustrating an exemplary flow of driver's terminal setting processing according to an exemplary embodiment.

Explanation follows regarding an example of driver's terminal setting processing performed by the vehicle information processing device 10 of the present exemplary embodiment, with reference to the flowchart illustrated in FIG. 5. This driver's terminal setting processing is executed by the CPU 20 reading the driver's terminal setting program from the ROM 22 or the storage 26, and expanding and executing the driver's terminal setting program in the RAM 24. Note that in the present exemplary embodiment, the processing is executed at a predetermined cycle until the driver's terminal is set.

(Example of Driver's Terminal Setting Processing)

At step S102, the CPU 20 acquires authentication information. More specifically, the CPU 20 acquires authentication information authenticated by the authentication device 32 using the functionality of the authentication information acquisition section 80.

At step S104, the CPU 20 identifies the portable terminal 14. More specifically, the CPU 20 uses the functionality of the terminal identification section 82 to identify the portable terminal 14 that corresponds to the occupant identified based on the authentication information authenticated by the authentication device 32.

At step S106, the CPU 20 determines whether or not a license is held. More specifically, the CPU 20 uses the functionality of the license information acquisition section 86 to reference occupant information stored in the occupant database 18 with respect to the occupant holding the identified portable terminal 14, and in a case in which driving license information has been registered, the processing transitions to step S108. In a case in which driving license information for the occupant has not been registered, the CPU 20 transitions to the processing of step S112, and notifies the portable terminal 14 that a driving license has not been registered.

The CPU 20 determines whether or not a terminal signal has been received at step S108. More specifically, in a case in which the CPU 20 acquires a predetermined signal transmitted from the portable terminal 14 authenticated by the functionality of the terminal signal acquisition section 84, the processing transitions to step S110. The predetermined signal referred to herein is, for example, a signal for registration as a driver. On the other hand, in a case in which the predetermined signal transmitted from the portable terminal 14 has not been acquired at step S108, the driver's terminal is not set, and the processing ends.

At step S110, the CPU 20 sets the driver's terminal. More specifically, the CPU 20 uses the functionality of the driver's terminal setting section 88 to set the portable terminal 14, which acquired the signal designating the driver using the terminal signal acquisition section 84, as the driver's terminal. Then, the driver's terminal setting processing is ended.

Note that in the present exemplary embodiment, autonomous driving at a level of 3 or higher is permitted on condition that the driver's terminal has been set by the driver's terminal setting processing.

As described above, according to the vehicle information processing device 10 of the present exemplary embodiment, since predetermined notification is provided only to the driver's terminal by the functionality of the notification section 92, unnecessary notification to terminals other than the driver's terminal can be suppressed. Moreover, by notifying the driver's terminal, even in situations in which the driver is not paying attention to the forward area of the vehicle, a transition to manual driving, a proposal for a lane change, and the like can be communicated.

Moreover, in the present exemplary embodiment, when a signal to the effect that the occupant is the driver is received from the identified portable terminal 14 through a predetermined application, the portable terminal is set as the driver's terminal. This enables the driver to set the driver's terminal merely by performing a predetermined operation via an application of the portable terminal, thereby eliminating the need for an operation or the like in the vehicle V.

Moreover, in the present exemplary embodiment, the driver can set the driver's terminal by authentication using the authentication device 32 provided at the driver's seat. This enables the driver's terminal to be easily set.

In particular, in the present exemplary embodiment, an occupant can use the authentication device 32 to authenticate at least one of a fingerprint, a voice print, an iris, or a face, and thereby identify the portable terminal 14. This eliminates the need to present the portable terminal 14 during authentication.

Moreover, in the present exemplary embodiment, the function of the license information acquisition section 86 is used to acquire information relating to an occupant's license, enabling the portable terminal 14 of an occupant without a driving license to be kept from being set as the driver's terminal.

Moreover, in the present exemplary embodiment, safety during autonomous driving can be improved by restricting transitions to an autonomous driving state until setting of the driver's terminal is performed.

Although explanation has been given regarding the vehicle information processing device 10 according to an exemplary embodiment, it will be apparent that various embodiments may be implemented within a range not departing from the gist of the present disclosure. Although information relating to the presence or absence of a driving license is acquired in the above-described exemplary embodiment, there is no limitation thereto, and a configuration not including the license information acquisition section 86 may be adopted.

Further, although a configuration is adopted in which transition to an autonomous driving state is restricted until the setting of the driver's terminal by the driver's terminal setting section 88 is performed in the above-described exemplary embodiment, there is no limitation thereto. Although in the exemplary embodiment described above, the CPU 20 executes the series of processing illustrated in FIG. 5 at a predetermined cycle until the driver's terminal is set, the timing at which the CPU 20 executes this processing is not limited to this. For example, the CPU 20 may perform the series of processing illustrated in FIG. 5 in order to perform setting of the driver's terminal when transitioning to the autonomous driving state. Alternatively, for example, the CPU 20 may perform the series of processing illustrated in FIG. 5 in order to perform setting of the driver's terminal when the vehicle starts from a stationary state. More specifically, the CPU 20 may perform the series of processing illustrated in FIG. 5 when the shift position of the vehicle is switched from parking to drive or reverse.

Although the portable terminal 14 in the above exemplary embodiment includes the display panel 66, the speaker 68, the vibrator 70, and the GPS device 72, as illustrated in FIG. 3, there is no limitation thereto. For example, in a case in which an occupant is in possession of a smart key with smart entry system functionality, a device such as a wristwatch worn together with a smart key may be set as the driver's terminal, and this device may be notified. In a case in which there is a portable terminal 14 registered as a digital key, the portable terminal 14 may be set as the driver's terminal without requiring setting of the driver's terminal by an occupant.

Moreover, the processing executed by the CPU 20 reading and executing a program in the above exemplary embodiment may be executed by various types of processor other than the CPU 20. Such processors include programmable logic devices (PLD) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). The above processing may be executed by any one of these various types of processor, or by a combination of two or more of the same type or different types of processor, and may be executed by plural FPGAs, or by a combination of a CPU and an FPGA, for example. The hardware structure of these various types of processors is more specifically an electric circuit combining circuit elements such as semiconductor elements.

Although the various data is stored in the storage 26 in the exemplary embodiment described above, there is no limitation thereto. For example, a non-transitory recording medium such as a compact disc (CD), a digital versatile disc (DVD), or universal serial bus (USB) memory may serve as a storage section. In this case, various programs, data, and the like are stored in these recording media.

Moreover, the flow of processing described in the above exemplary embodiments is an example, and unnecessary steps may be deleted, new steps may be added, or the processing order may be rearranged within a range not departing from the gist of the present invention.

The following appendices are further disclosed regarding the above exemplary embodiment.

(Appendix 1)

A vehicle information processing device, for application to a vehicle configured to perform all driving operations under a fixed condition, the device including: a terminal identification section configured to identify a portable terminal corresponding to authentication information authenticated by an authentication device provided at the vehicle; a driver's terminal setting section configured to set a driver's terminal used by a driver, based on information received from the identified portable terminal; and a notification section configured to notify the driver's terminal in a case in which a predetermined condition is satisfied in an autonomous driving state in which all driving operations are performed by the vehicle.

(Appendix 2)

The vehicle information processing device of appendix 1, in which the driver's terminal setting section sets the identified portable terminal as the driver's terminal when a signal designating the driver is received from the identified portable terminal via a predetermined application.

(Appendix 3)

The vehicle information processing device of appendix 1, in which: the authentication device is provided peripherally to plural seats including the driver's seat, and the driver's terminal setting section sets, as the driver's terminal, a portable terminal corresponding to authentication information authenticated by the authentication device provided at the driver's seat.

(Appendix 4)

The vehicle information processing device of any one of appendix 1 to appendix 3, in which: the authentication device is configured to authenticate at least one of a fingerprint, a voice print, an iris, or a face, of an occupant, and the terminal identification section identifies a portable terminal corresponding to an occupant identified based on the authentication information authenticated by the authentication device.

(Appendix 5)

The vehicle information processing device of any one of appendix 1 to appendix 4, in which the driver's terminal setting section refers to information relating to the presence or absence of a driving license with respect to an occupant identified based on the authentication information, and excludes a portable terminal of an occupant who does not have a driving license from candidates for the driver's terminal.

(Appendix 6)

The vehicle information processing device of any one of appendix 1 to appendix 5, in which a transition to an autonomous driving state is restricted until setting of a driver's terminal is performed by the driver's terminal setting section.

(Appendix 7)

A vehicle information processing method, including: identifying a portable terminal corresponding to authentication information authenticated by an authentication device provided at a vehicle capable of all driving operations under a fixed condition; setting a driver's terminal used by a driver, based on information received from the identified portable terminal; and notifying the driver's terminal in a case in which a predetermined condition is satisfied in an autonomous driving state in which all driving operations are performed by the vehicle.

(Appendix 8)

A program executable by a computer to perform processing including: identifying a portable terminal corresponding to authentication information authenticated by an authentication device provided at a vehicle capable of all driving operations under a fixed condition; setting a driver's terminal used by a driver, based on information received from the identified portable terminal; and notifying the driver's terminal in a case in which a predetermined condition is satisfied in an autonomous driving state in which all driving operations are performed by the vehicle.

What is claimed is:

1. A vehicle information processing device, for application to a vehicle configured to perform all driving operations under a fixed condition, the device comprising:
   a terminal identification section configured to identify a portable terminal corresponding to authentication information authenticated by an authentication device provided at the vehicle;
   a driver's terminal setting section configured to set a driver's terminal used by a driver, based on information received from the identified portable terminal; and
   a notification section configured to notify the driver's terminal in a case in which a predetermined condition is satisfied in an autonomous driving state in which all driving operations are performed by the vehicle, wherein
   the authentication device is provided peripherally to a plurality of seats including a driver's seat,
   the driver's terminal setting section sets, as the driver's terminal, a portable terminal corresponding to authentication information authenticated by the authentication device provided at the driver's seat,
   a transition to an autonomous driving state from a manual driving state is restricted until setting of a driver's terminal is performed by the driver's terminal setting section, and
   the notification section is configured to notify the driver's terminal when a distance or a time required for the vehicle to transition from the autonomous driving state to the manual driving state is less than a predetermined value.

2. The vehicle information processing device of claim 1, wherein the driver's terminal setting section sets the identified portable terminal as the driver's terminal when a signal designating the driver is received from the identified portable terminal via a predetermined application.

3. The vehicle information processing device of claim 1, wherein:

the authentication device is configured to authenticate at least one of a fingerprint, a voice print, an iris, or a face, of an occupant, and the terminal identification section identifies a portable terminal corresponding to an occupant identified based on the authentication information authenticated by the authentication device.

\* \* \* \* \*